United States Patent
Varma et al.

(10) Patent No.: US 7,706,415 B2
(45) Date of Patent: Apr. 27, 2010

(54) PACKET MULTIPLEXING MULTI-CHANNEL AUDIO

(75) Inventors: Ankur Varma, San Francisco, CA (US); Andrew Wayne Walters, San Jose, CA (US); John Allen Tardif, San Jose, CA (US); Brian Lloyd Schmidt, Bellevue, WA (US); Sajid Salim Topiwala, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1671 days.

(21) Appl. No.: 10/901,575

(22) Filed: Jul. 29, 2004

(65) Prior Publication Data

US 2006/0023706 A1 Feb. 2, 2006

(51) Int. Cl.
*H04J 3/04* (2006.01)
(52) U.S. Cl. .................................................. 370/535
(58) Field of Classification Search ............. 370/535, 370/536, 537, 503, 498; 704/500; 375/E7.271, 375/E7.267, E7.022; 386/96, 98, 104, 105
See application file for complete search history.

(56) References Cited

U.S. PATENT DOCUMENTS

| | | | | |
|---|---|---|---|---|
| 5,680,512 | A * | 10/1997 | Rabowsky et al. | 704/504 |
| 5,974,380 | A | 10/1999 | Smyth et al. | |
| 6,222,983 | B1 * | 4/2001 | Heo | 386/96 |
| 6,405,338 | B1 * | 6/2002 | Sinha et al. | 714/752 |
| 6,584,125 | B1 * | 6/2003 | Katto | 370/537 |
| 6,598,172 | B1 * | 7/2003 | VanDeusen et al. | 713/503 |
| 6,611,212 | B1 | 8/2003 | Craven et al. | |
| 6,957,182 | B1 * | 10/2005 | Turnbull et al. | 704/229 |
| 6,965,727 | B1 * | 11/2005 | Sawabe et al. | 386/96 |
| 7,039,054 | B2 * | 5/2006 | Narad et al. | 370/392 |
| 7,062,429 | B2 * | 6/2006 | Faller | 704/200.1 |
| 7,219,053 | B2 * | 5/2007 | Fuchigami et al. | 704/219 |
| 7,236,933 | B2 * | 6/2007 | Fuchigami et al. | 704/500 |
| 7,240,014 | B2 * | 7/2007 | Fuchigami et al. | 704/500 |
| 7,302,396 | B1 * | 11/2007 | Cooke | 704/500 |
| 7,376,692 | B2 * | 5/2008 | Kovacevic et al. | 709/200 |
| 7,460,629 | B2 * | 12/2008 | Faller et al. | 375/372 |
| 2001/0007568 | A1 * | 7/2001 | Morris | 370/473 |
| 2004/0184783 | A1 * | 9/2004 | Tanaka et al. | 386/95 |
| 2004/0236583 | A1 * | 11/2004 | Tanaka et al. | 704/500 |
| 2006/0023706 | A1 * | 2/2006 | Varma et al. | 370/389 |

OTHER PUBLICATIONS

Kobayashi, K. et al., "RTP Payload Format for 12-Bit DAT Audio and 20- and 24-bit Linear Sampled Audio", *The Internet Society*, 2002, http://delivery.acm.org, 15 pages.

Viljoen, D.W. et al., "A 2-D MPEG-4 Multimedia Authoring Tool", *Association doe Computing Machinery, Inc.*, 2003, 151-160.

* cited by examiner

*Primary Examiner*—Anh-Vu Ly
(74) *Attorney, Agent, or Firm*—Woodcock Washburn LLP

(57) ABSTRACT

Systems and methods for providing multi-channel audio using a reduced amount of resources for the decoding process. A 5.1 channel audio stream is divided into three stereo streams. The packets from each of three stereo streams are multiplexed to create a pseudo-5.1 channel audio stream. The pseudo 5.1 channel audio stream is then decoded and demultiplexed at the output to create the output 5.1 channel audio sound. As such, the decoder resources only have decode a single pseudo 5.1 stream. This technique is equally applicable to 7.1 or other multi-channel formats.

12 Claims, 3 Drawing Sheets

PACKET MULTIPLEXING MULTI-CHANNEL AUDIO

FIELD OF THE INVENTION

This invention relates in general to the field of computing devices. More particularly, this invention relates to a system and method of dividing a multi-channel audio stream into stereo streams and multiplexing the stereo streams into a pseudo multi-channel stream for decoding.

BACKGROUND OF THE INVENTION

Historically, multi-channel audio formats were developed for cinema applications. However, in recent years multi-channel audio, such as Dolby Digital and DTS has become prevalent in home theater systems. Typical formats include 4.0, 5.1 and more recently, 7.1. For instance, the 5.1 Dolby Digital format comprises two front speakers, two rear speakers, one center speaker and one low frequency effects (LFE) speaker (e.g., a sub-woofer). This provides a surround sound experience to the listener.

While multi-channel audio provides an improved listener experience, multi-channel audio streams require significantly more decoding resources than conventional stereo streams. This is because the information content of the multi-channel streams is much more than stereo streams. The additional decoding resources undesirably increase hardware requirements and cost.

Thus, there is a need for a decoder for use with multi-channel audio streams that can decode such streams while avoiding the hardware cost of conventional multi-channel audio decoders. The present invention provides such a solution.

SUMMARY OF THE INVENTION

The present invention is directed to systems and methods for providing multi-channel audio using a reduced amount of resources for the decoding process. The present invention splits a 5.1 channel audio stream into three stereo streams and then multiplexes the packets from the three stereo streams to create a pseudo-5.1 channel audio stream. The pseudo 5.1 channel audio stream is then decoded and demultiplexed at the output to create the output 5.1 channel audio sound. Thus, the decoder resources only have to decode packets from one stereo stream at a time. This technique is equally applicable to 7.1 or other multi-channel formats.

In accordance with an aspect of the invention, there is provided methods and systems for encoding multi-channel audio data into a multiplexed audio stream and for decoding the multiplexed audio stream. According to a first aspect, there is provided a method of encoding multi-channel audio data. The method includes dividing the multi-channel audio data into streams; encoding each of the streams to create encoded streams; and multiplexing the encoded streams to create a multiplexed audio stream. The multiplexed audio stream includes packets of data from the encoded streams.

According to a feature of the invention, the method may include providing a skip field within each packet that indicates where a next packet is for a particular stream in the multiplexed audio stream. Each packet may contain a number of frames, where each frame contains a variable number of bits and represents a constant number of samples.

According to other features, there is provided methods of encoding, include those that account for deadlocks. The encoding may be performed by counting cumulative frames or a cumulative time.

According to another aspect of the invention, there is provided a method of decoding a multiplexed audio stream. The method includes receiving the multiplexed audio stream; inputting the multiplexed audio stream into a decoder; outputting multiple streams; and multiplexing the multiple streams into a multi-channel audio output.

According to a feature of the invention, the method may include fetching the multiplexed audio stream from a storage medium. Also, there is provided a method of seeking within the multiplexed pseudo multi-channel audio stream in response to a request. Seeking may be performed by using cue files, timestamps, or by using constant-sized encoded files.

According to another feature of the invention, the method includes providing an audio codec having an additional layer to decode the multiplexed pseudo multi-channel audio stream.

According to another aspect of the invention there is provided a system for decoding a multiplexed audio stream. The system includes a decoder that receives the multiplexed audio stream and outputs multiple streams, and a multiplexor that multiplexes the multiple streams into a multi-channel audio output. A codec may also be provided.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
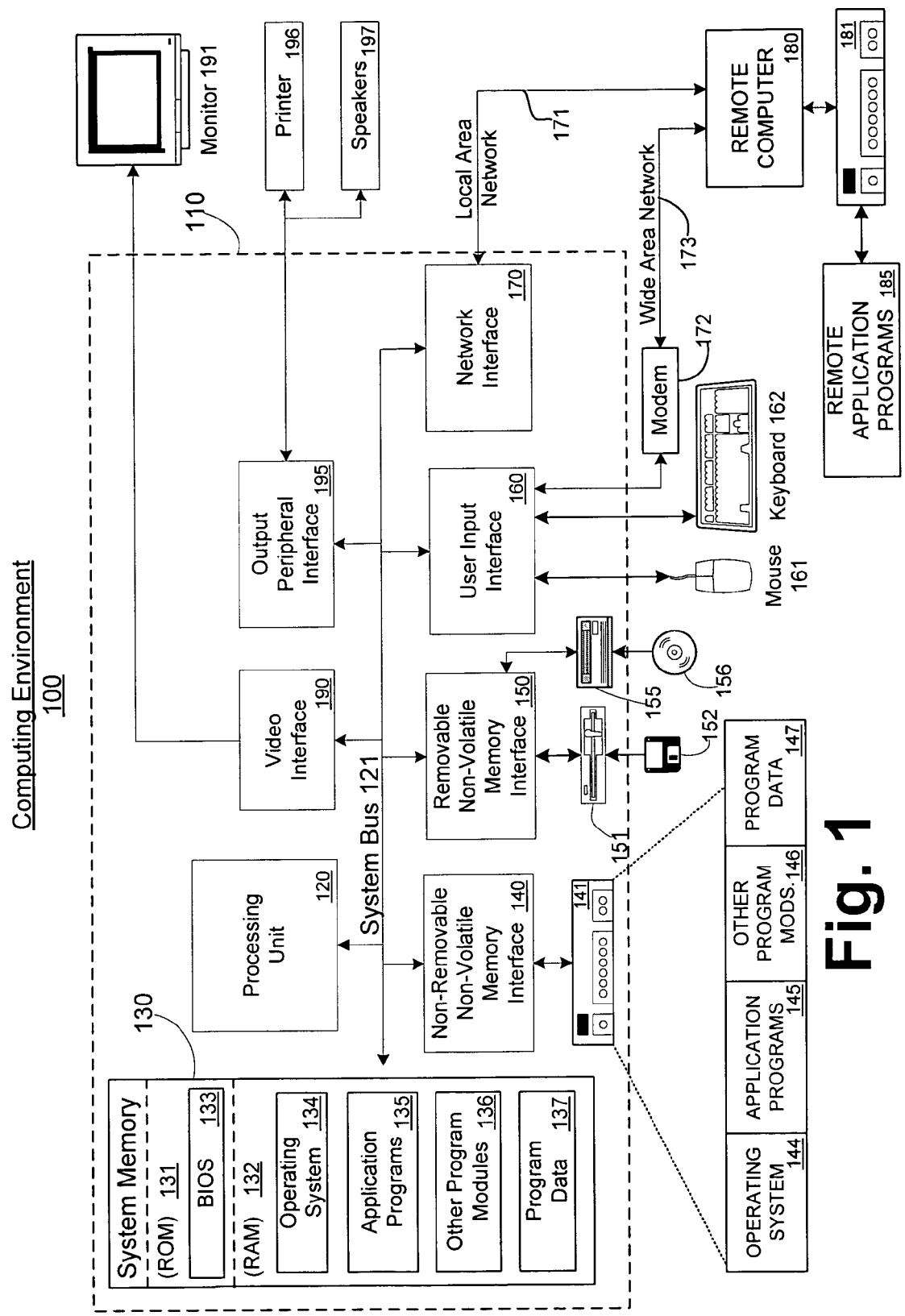
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments of Packet Multiplexed Multi-Channel Audio

The present invention implements systems and methods for dividing a 5.1 channel audio stream (or other multi-channel audio stream) into three stereo streams. Packets from each of the three stereo streams are multiplexed to create a pseudo-5.1 channel audio stream. Thereafter, the packets are decoded and multiplexed from the stereo streams to render a 5.1 channel audio stream. Thus, a decoder only decodes packets from one stereo stream at a time before the stereo channels are multiplexed to re-create the original 5.1 stream.

Figure 2:
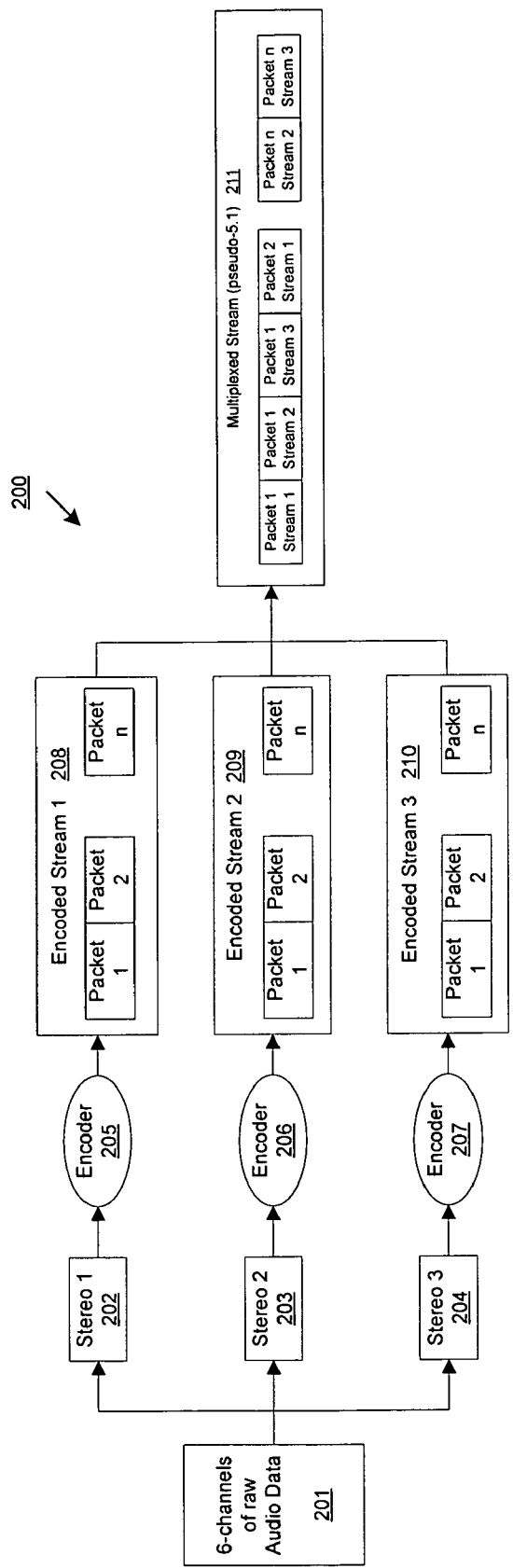
FIG. 2 illustrates an encoding process in accordance with the present invention.

Referring now to FIG. 2, there is illustrated an encoding process in accordance with the present invention. As shown, audio data 201 is divided into three stereo streams 202, 203 and 204. Each of the stereo streams is encoded by encoders 205, 206 and 207 to produce encoded streams 208, 209 and 210. The encoded streams 208, 209 and 210 are multiplexed into a single file 211. Each packet for a given stream in the interleaved file has a "packet skip" field that indicates where the next packet is for that stream. Each packet contains a number of frames, where each frame contains a variable number of bits but represents a constant number of samples (and therefore a constant length of time). Higher bitrate streams contain fewer frames per packet, while lower bitrate streams contain more frames per packet. By multiplexing the streams together, the present invention advantageously creates a single file (file 211) that provides multi-channel audio with only a one seek of the storage media, as will be described below.

In accordance with the present invention, a first multiplexing algorithm with no deadlock avoidance may be used to multiplex the packets. According to this first algorithm, the interleaving of packets is based solely on the bitrate of the streams. The first algorithm has no restriction on the maximum value that the packet skip field can have.

For interleaving n streams numbered from 0 to n−1, the algorithm is as follows:

1. Initialization: Insert one packet from each stream, in the order 0 to n−1. Keep track of the cumulative number of frames inserted for each stream.

2. Add one packet from whichever stream has the fewest number of cumulative frames inserted so far. Update the cumulative frame count for that stream. Continue until every packet from every stream has been added.

If two streams are being multiplexed and Stream 0 (S0) has 6 frames per packet and Stream 1 (S1) has 10 frames per packet (it is noted, however, that the number of frames per packet can vary from packet to packet). Then the algorithm operates as follows:

First, insert packet from S0, then from S1. Initialize cumulative frame counts to 6 and 10, respectively. Next, S0 has the lowest frame count, so add a packet from S0, and update its cumulative frame count to 12. Then insert a packet from S1 since its count is 10. The order of packets with cumulative frame counts continues as follows:

S0(6) S1(10) S0(12) S1(20) S0(18) S0(24) S1(30) S0(30)(tie)S0(36) S1(40) . . . .

Using this algorithm, a deadlock can occur if the bitrate of two streams is significantly different. For instance, suppose S0 has 10 frames per packet and S1 has 1 frame per packet. The algorithm then produces the following interleaved stream:

S0 S1 S1 S1 S1 S1 S1 S1 S1 S1 S1 S0 S1 . . . .

Suppose S0 and S1 are to be decoded concurrently, but only 6 packets are buffered at a time in 2 buffers of 3 packets each. This means that initially the first buffer holds 10 frames from S0 (1 packet) and 2 frames from S1 (2 packets), and the second buffer holds no frames from S0 and 3 frames from S1 (3 packets). After 5 frames from each stream have been decoded, it is necessary to read more data for stream S1, which means the first 3-packet buffer is cleared and reloaded. However, the first buffer still contains 5 more frames for stream S0, so it cannot be cleared out. The only way to continue decoding the two interleaved streams concurrently is to increase the size of the buffers.

To avoid this problem, a second algorithm with deadlock avoidance may be used in accordance with the present invention. To avoid conditions like the one described above, the bitrate of a low bitrate stream can be increased so that the number of packets that need to be skipped to move from one packet to the next for a given stream is constrained.

For interleaving n streams numbered from 0 to n−1, with the constraint that the maximum number of packets to skip at any given point is m, the algorithm is as follows:

1. Initialization: Insert one packet from each stream, in the order 0 to n−1. The cumulative number of frames inserted for each stream is tracked as well as the current skip count for each stream. After initialization, stream 0 has a current skip count of n−1 (i.e., if the next packet comes from stream 0, the first packet for stream 0 would end up having a packet skip of n−1). Stream n−1 has a current skip count of 0.

2. If any stream's current skip count is equal to the maximum skip count m, then skip to step 3. Otherwise, add one packet from whichever stream has the fewest number of cumulative frames inserted so far. The cumulative frame count for that stream is updated, and the stream's current skip count is reset to 0. The current skip count for all other streams is incremented. Step 2 is repeated until every packet from every stream has been added.

3. If one of the steams has reached the maximum skip count (e.g., stream k), a packet from that stream is inserted, but the bitrate of the stream needs to be adjusted to keep the all of the streams in sync. Next, it is determined which stream has the fewest number of cumulative frames inserted so far. If it is stream k, then no bitrate adjustment is necessary, so one packet from stream k is added, its cumulative frame count is updated, its skip count is reset to 0, and the other streams' current skip count is updated. Processing returns to step 2, otherwise, proceed to step 4.

4. Bitrate adjustment needs to be done for stream k. The previous packet inserted for stream k is truncated such that the cumulative number of frames inserted for stream k is equal to that of the stream with the fewest cumulative number of frames inserted. Go to step 5.

5. Insert a packet for stream k. The beginning of this packet consists of the frames that were truncated from the previous packet. Next, a packet is then read in. The first part of this packet is used to fill in the rest of the packet that is inserted.

The remainder of the packet is stored in a buffer and is used as the beginning of a subsequent packet to be inserted for stream k. The cumulative frame count for stream k is updated, its skip count is reset to 0, and the other streams' current skip count is incremented. Processing returns to step 2.

Returning to the example where stream S0 has 10 frames per packet and S1 has 1 frame per packet, if there are 2 buffers of 3 packets each, then it is desirable to have a maximum packet skip of 2 to ensure that at least one packet from each stream is in each buffer. This will prevent a deadlock condition from occurring.

Therefore, an initialization is first performed, which produces the following (cumulative frame counts are shown in parentheses):

S0(10) S1(1)

At this point, the current skip count for S0 is 1, and for S1 it's 0, both of which are less than the maximum of 2. So, a packet from S1 is inserted because it has the smallest cumulative frame count:

S0(10) S1(1) S1(2)

Now the current skip count for S0 is 2, which is the maximum. It is preferable to insert a packet from S1, since it is farther behind, but the algorithm above calls for inserting a packet from S0. If another 10-frame packet for S0 was inserted, it would soon be far enough ahead of S1 that a deadlock would occur. This is why the bitrate for S0 is adjusted. Following step 3 of the algorithm above, stream S1 has the fewest number of frames inserted so far (i.e., 2). So, in step 4, the previous packet that was inserted for S0 is truncated so that S0 is even with S1:

S0(2) S1(1) S1(2)

Next at step 5, a packet for S0 is inserted. With the 8 frames that were truncated from the first packet from S0, 2 additional frames from the next packet that is read in are appended, to generate a 10-frame packet. This leaves 8 frames that are stored in a buffer:

S0(2) S1(1) S1(2) S0(12) (S0 buffer has 8 frames)

Going back to step 2, 2 more packets from S1 are inserted:

S0(2) S1(1) S1(2) S0(12) S1(3) S1(4) (S0 buffer has 8 frames)

Once again, S0 has reached its maximum skip count. Thus, 8 frames from the previous packet for S0 are removed to reduce its cumulative frame count to that of S1. These form the beginning of the packet to be inserted for S0. Next, there is space for 2 more frames in the next packet, but 8 are buffered, so 2 are taken from the buffer, leaving 6. Note that there is no need to read in a packet for S0 in this case. This leaves:

S0(2) S1(1) S1(2) S0(4) S1(3) S1(4) S0(14) (S0 buffer has 6 frames)

If this pattern is continued, there will be half as many packets for S0 as there are for S1. But, the bitrate for S0 has been artificially increased, because S0 originally had one-tenth as many packets. Note that this algorithm is just one of many possible algorithms. Other algorithms may produce interleaved streams that are more efficient from a bitrate perspective. For instance, careful alignment within the 2 buffers having 3 packets each, then the following interleaving would work:

S0(5) S1(1) S1(2) S1(3) S1(4) S1(5) S0(10) S1(6) S1(7) S1(8) S1(9) S1(10) . . .

However, this creates a "near-deadlock" condition that could reduce the decoder efficiency if the stream is read from a DVD or other media. The first buffer contains one packet from S0 and 2 packets from S1, and the second buffer contains 3 packets from S1. The two buffers together contain a total of 5 frames from each stream. Because the 5th frame from S0 is in the first buffer and the 5th frame from S1 is in the second buffer, both buffers are exhausted simultaneously. This means that the advantage that double-buffering has in hiding latency is lost.

A method of multiplexing streams with different sample rates will now be described. As noted above, the goal of the multiplexing algorithms is to keep the individual streams as close to being synchronized as possible with one another. If all of the streams have the same sampling rate, then it is sufficient to count frames, as explained above. However, if streams have different sampling rates, then it is preferable to count with regard to time. Otherwise, counting frames and time behave substantially the same.

As an example, suppose that S0 and S1 both have 10 frames per packet. However, S0 is sampled at 32 kHz and S1 is sampled at 44.1 kHz. If there are 512 samples per frame, then a frame at 32 kHz has a duration of 16 ms while a frame at 44.1 kHz has a duration of 11.6 ms. So, a packet from S0 has 160 ms of audio, while a packet from S1 has 116 ms. Following the first algorithm above using time instead of frames, the following interleaving (with cumulative time shown in parentheses) results:

S0(160) S1(116) S1(232) S0(320) S1(348) S0(480) S1(464) S1(580) S0(640) . . .

In accordance with the present invention, the mechanism for multiplexing the streams is extendible to more channels. This is because the packet header of a packet from a particular stream contains a "skip" number that tells the decoder how many packets to skip in order to reach the next packet from that stream. For example, assume there are stereo streams S0, S1 and S2 multiplexed as follows:

S0 S1 S2 S1 S1 S2 S0 S2 S0 S2 S1 . . .

The file header also contains information regarding how many stereo streams are multiplexed into the final pseudo-5.1 stream. This information may be contained in an 8-bit field that is read by the decoder. In this example, the first 3 packets of the stream contain 1 packet from each of the constituent streams in order to prime the decoder. Here the packet header for the first packet which belongs to S0 will be set to 5 since 5 packets must be skipped in order to reach the next packet from S0. Similarly, the packet header for the first packet which belongs to S1 will have a skip of 1 and so on.

This mechanism is easily extended to a 7.1 case where there are 4 stereo streams. For a 7.1 stream, the file header will contain information that there are 4 stereo streams and the first 4 packets will be from the 4 constituent streams (i.e., 1 from each stream). The mechanism of the present invention can be extended to combinations of mono and stereo streams or even to combinations of higher order streams (streams with more than 2 channels).

Yet another way to extend this mechanism is to multiplex multiple streams and then select a subset of the streams in the demultiplexing operation, thereby mixing and applying effects on some of the streams. This may be desirable, for example, in a case where the multiplexed streams are all variations on a certain sound effect, and by switching between streams, adjusting mixing ratios, or altering effects, a very wide variation in the original sound effect can be achieved on the fly.

Figure 3:
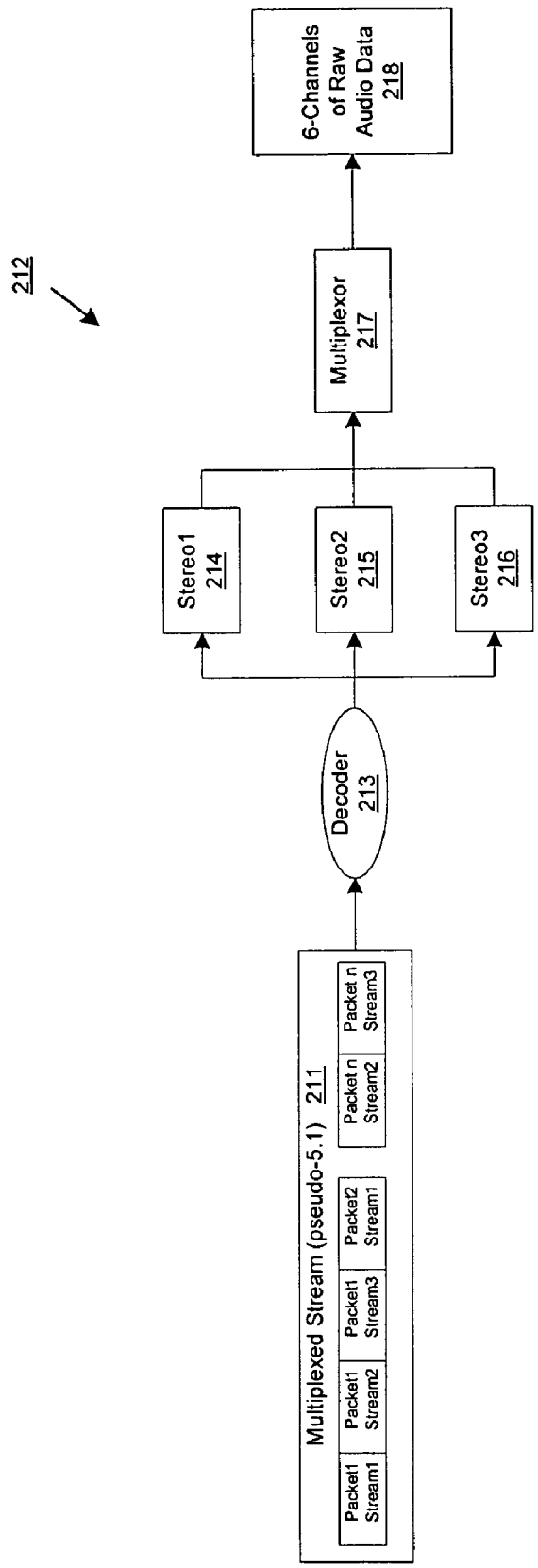
FIG. 3 illustrates a decoding process in accordance with the present invention

Referring now to FIG. 3, there is illustrated a decoding process in accordance with the present invention. The multiplexed file 211 is input to a decoder 212 that outputs three stereo streams 213, 214 and 215. The output streams 213, 214 and 213 are multiplexed by multiplexor 216 into a six-channels of audio data (e.g., a 5.1 stream) that is output to, e.g., a surround sound system. In accordance with the present invention, the decoding resources required for this approach are much less than the resources needed for decoding a 5.1 stream. However, the 5.1 structure is maintained because the packet multiplexing is performed in a manner such that the individual stereo streams are maintained in synchronism. This helps the decoder fetch the same temporal audio portion from all the streams.

Furthermore, by multiplexing the packets of the stereo streams, fewer fetches from the storage medium are required. This is an important benefit for many time critical systems. For instance, for where the storage medium is a DVD, fetching data can be time consuming since it can take 150-200 ms to seek to the appropriate portion of the DVD where a file resides. Where many (i.e., hundreds) of audio streams are mixed together to create the final output, the seeking problem is severely exacerbated if the number of streams that need to be fetched is tripled by creating 3 stereo streams for each 5.1 stream.

The present invention also addresses seeking within a stream. Seeking may be performed by using cue files, timestamps, or by encoding constant-sized files. While the latter sacrifices compression, it is easy to determine how far to seek into a known file length. Cue files contain information regarding how far to jump into a file to go x number seconds. Timestamps embedded in the packet header can be used in conjunction with a forward search algorithm to locate the first available packet of each stream and to correctly align the decoded output data. It is possible to use a combination of both methods may be used.

An exemplary algorithm for seeking may be as follows: Seek to the intended file position, decode the first packet, record what stream the packet belongs to (file header attributes indicate how many streams to expect and what the stream assignments are (i.e., stream 0 for left/right front channels, stream 1 for left/right surround channels, etc.)). Next, examine the skip field in packet header to see where the next packet is for the current stream. Also look at the timestamp field in packet header to see what time the current samples are for. Then decode next packet header. Packets for all streams are decoded following the above. Next, mark as valid (i.e., start hardware playback) using the first packet for all streams that have the same timestamp. From that point on, the decoding process proceeds as normal.

The present invention may be implemented by a combination of hardware and software. In particular, a layer may be added to the codec (e.g., WMA) together with a post-processing step in hardware to recompose the mono, stereo, etc. streams into the multi-channel stream. Further, the decoder will need to be able to demultiplex the stream 211 when decoding.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. In addition, a the encode function and the decode function need not reside on the same system. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for encoding multi-channel audio data using a computing device, comprising:
dividing said multi-channel audio data into streams;
encoding each of said streams to create encoded streams;
multiplexing said encoded streams to create a multiplexed audio stream, said multiplexed audio stream comprising packets of data from said encoded streams;
providing a skip field within each packet that indicates where a next packet is for a particular stream in said multiplexed audio stream, wherein, dividing, encoding, multiplexing, and providing steps are implemented by a computing device; and
selecting the placement of the skip field based on a deadlock avoidance algorithm.

2. The method of claim 1, wherein said each packet contains a number of frames, where each frame contains a variable number of bits and represents a constant number of samples.

3. The method of claim 2, further comprising:
(a) inserting a packet from each stream, in an order 0 to n−1, for streams numbered from 0 to n−1, wherein n is an integer, where n represents the number of streams;
(b) tracking a cumulative number of frames inserted for each stream;
(c) adding one packet from a stream having a fewest number of cumulative frames inserted so far and updating a cumulative frame count for said stream; and
(d) repeating the step (c) until every packet from every stream has been added.

4. The method of claim 2, further comprising:
(a) inserting one packet from each stream, in the order 0 to n−1 for streams numbered from 0 to n−1, where the maximum number of packets to skip is m, where m represents a maximum skip count, wherein m is an integer;
(b) tracking a cumulative number of frames inserted for each stream and a current skip count for each stream;
(c) determining if a first stream's current skip count is equal to m, and if so, skipping to step
(d), otherwise adding one packet from a second stream having the fewest number of cumulative frames inserted so far, updating a cumulative frame count and resetting a current skip count for said second stream, incrementing a current skip count for all other streams, and repeating step (c) until every stream has been added; and
(e) determining if a bitrate of said first stream needs to be adjusted to keep the all of the streams in sync by determining which stream has the fewest number of cumulative frames inserted so far, and:
if it is said first stream then no bitrate adjustment is necessary, then adding one packet from said first stream, updating a cumulative frame count of said first stream, resetting a skip count of said first stream, updating a skip count of the other streams, and returning to step (b); or
if it is not said first stream then adjusting a bitrate for said first stream by truncating a previous packet for said first stream that is inserted into said multiplexed audio stream such that a cumulative number of frames inserted for said first stream is equal to that of a second stream with the fewest cumulative number of frames inserted;

(e) inserting a packet first for said first stream where a beginning of said first packet includes frames that were truncated from a previous packet, reading a next packet and using a portion of said next packet to complete said first packet, and storing a remainder of said next packet in a buffer, updating a cumulative frame count for said first stream, resetting a skip count of said first stream, incrementing the other streams' current skip count, and returning to step (b).

5. The method of claim 3, wherein a cumulative time is tracked rather than said cumulative frame count.

6. The method of claim 4, wherein a cumulative time is tracked rather than said cumulative frame count.

7. The method of claim 1, further comprising providing information regarding how many streams are multiplexed into said multiplexed stream.

8. The method of claim 3, wherein the multiplexed streams have different sampling rates.

9. The method of claim 3, wherein a file header contains information regarding how many streams are multiplexed into a final stream.

10. The method of claim 3, wherein the combination of streams can consist of mono and stereo streams and even higher order streams.

11. The method of claim 3, wherein said streams contain cue files.

12. The method of claim 3, wherein said streams contain timestamps.

* * * * *